United States Patent
Vollmer et al.

(10) Patent No.: US 10,935,740 B2
(45) Date of Patent: Mar. 2, 2021

(54) OPTICAL PLUG-IN CONNECTOR MODULE FOR A MODULAR INDUSTRIAL PLUG-IN CONNECTOR

(71) Applicant: HARTING Electric GmbH & Co. KG, Espelkamp (DE)

(72) Inventors: Christian Vollmer, Herford (DE); Lutz Troeger, Osnabrueck (DE); Markus Friesen, Espelkamp (DE)

(73) Assignee: HARTING ELECTRIC GMBH & CO. KG

( * ) Notice: Subject to any disclaimer, the term of this patent is extended or adjusted under 35 U.S.C. 154(b) by 0 days.

(21) Appl. No.: 16/470,137

(22) PCT Filed: Feb. 5, 2018

(86) PCT No.: PCT/DE2018/100089
§ 371 (c)(1),
(2) Date: Jun. 14, 2019

(87) PCT Pub. No.: WO2018/149445
PCT Pub. Date: Aug. 23, 2018

(65) Prior Publication Data
US 2020/0012057 A1    Jan. 9, 2020

(30) Foreign Application Priority Data
Feb. 14, 2017   (DE) .................... 10 2017 102 885.4

(51) Int. Cl.
*G02B 6/26*    (2006.01)
*G02B 6/38*    (2006.01)
(Continued)

(52) U.S. Cl.
CPC ........... *G02B 6/4261* (2013.01); *G02B 6/381* (2013.01); *G02B 6/4286* (2013.01); *G02B 6/4292* (2013.01)

(58) Field of Classification Search
CPC ..... G02B 6/4261; G02B 6/381; G02B 6/4286
(Continued)

(56) References Cited

U.S. PATENT DOCUMENTS 3,936,143 A * 2/1976 Sato .................... G02B 6/3843
 385/67
4,713,538 A * 12/1987 Theocharous ......... G01D 5/268
 250/227.23
(Continued)

FOREIGN PATENT DOCUMENTS

EP    0860906    5/2004    ........... H01R 13/514
JP    S58190739    11/1983    ............ G01M 11/00
(Continued)

OTHER PUBLICATIONS

International Preliminary Report on Patentability issued in application No. PCT/DE2018/100089, dated Aug. 29, 2019 (7 pgs).
(Continued)

*Primary Examiner* — Kaveh C Kianni
(74) *Attorney, Agent, or Firm* — Hayes Soloway P.C.

(57) ABSTRACT

Disclosed is a plug-in connector module having at least one optical waveguide and at least one optical sensor, preferably a photodiode, which is arranged near the optical waveguide. The optical sensor can reliably detect malfunction of the plug-in connector module in good time. Also disclosed is a method for detecting signal losses during signal transmission in an optical plug-in connector module, in which an optical signal is guided through at least one optical waveguide of the plug-in connector module, and the optical signal is scattered in the event of a structural defect of the optical waveguide or dirt on the front surface of the optical waveguide, the scattered light reaching a photodiode and a current or a voltage being produced thereby on the photodiode. If a threshold value of the current or the voltage on the photo-
(Continued)

US 10,935,740 B2

Page 2 diode is exceeded, an interference signal is generated by an electronic evaluation system.

6 Claims, 3 Drawing Sheets

(51) Int. Cl.
  *G02B 6/28* (2006.01)
  *G02B 6/42* (2006.01)
(58) Field of Classification Search
  USPC .......................................................... 385/53
  See application file for complete search history.

(56) References Cited

U.S. PATENT DOCUMENTS

| | | | | | |
|---|---|---|---|---|---|
| 5,412,748 | A | * | 5/1995 | Furuyama | G02B 6/3839 257/98 |
| 5,463,710 | A | * | 10/1995 | Filgas | G02B 6/4225 385/44 |
| 5,467,419 | A | * | 11/1995 | Roff | G02B 6/32 385/92 |
| 5,676,142 | A | * | 10/1997 | Miwa | A61B 5/0091 600/309 |
| 5,764,400 | A | * | 6/1998 | Itou | G02F 1/225 359/245 |
| 6,004,162 | A | | 12/1999 | Harting et al. | 439/701 |
| 6,061,374 | A | * | 5/2000 | Nightingale | H01S 5/02208 372/50.21 |
| 6,087,194 | A | * | 7/2000 | Matsukura | H01L 31/0203 438/25 |
| 6,138,046 | A | * | 10/2000 | Dalton | A61N 5/0601 356/300 |
| 6,487,327 | B1 | * | 11/2002 | Mock | G02B 6/3807 385/12 |
| 6,908,779 | B2 | * | 6/2005 | Ogawa | G02B 6/423 438/27 |
| 7,088,880 | B1 | * | 8/2006 | Gershman | G01M 11/37 385/12 |
| 7,826,043 | B1 | * | 11/2010 | Urban | H04B 10/0771 356/73.1 |
| 8,979,568 | B2 | | 3/2015 | Herbrechtsmeier et al. | H01R 13/62966 |
| 2004/0223703 | A1 | * | 11/2004 | Miyamae | G02B 6/4212 385/88 |
| 2005/0020926 | A1 | * | 1/2005 | Wiklof | G02B 23/24 600/476 |
| 2005/0063651 | A1 | * | 3/2005 | Hamasaki | G02B 6/423 385/100 |
| 2005/0201661 | A1 | * | 9/2005 | Loock | G01J 3/0218 385/12 |
| 2006/0013532 | A1 | * | 1/2006 | Wan | G01M 11/35 385/31 |
| 2006/0147158 | A1 | * | 7/2006 | Sato | G02B 6/4204 385/78 |
| 2007/0123776 | A1 | * | 5/2007 | Aharoni | G01H 9/004 600/437 |
| 2010/0008676 | A1 | * | 1/2010 | Kojima | G02B 6/424 398/141 |
| 2010/0329604 | A1 | * | 12/2010 | Kojima | G02B 6/2852 385/31 |
| 2012/0224168 | A1 | * | 9/2012 | Hirai | H04B 10/071 356/73.1 |
| 2012/0248078 | A1 | * | 10/2012 | Zediker | E21B 44/00 219/121.67 |
| 2015/0103336 | A1 | * | 4/2015 | Rolston | G01J 1/0425 356/73.1 |
| 2015/0308863 | A1 | * | 10/2015 | Chen | G01D 5/268 385/12 |
| 2015/0341112 | A1 | * | 11/2015 | Suzuki | H04B 10/0799 398/25 |
| 2016/0154193 | A1 | * | 6/2016 | Brukilacchio | G02B 6/4272 315/151 |
| 2016/0258839 | A1 | * | 9/2016 | Froggatt | G01M 11/3172 |

FOREIGN PATENT DOCUMENTS

| | | | | |
|---|---|---|---|---|
| JP | 2001255231 | | 9/2001 | ............ B01M 11/00 |
| WO | WO2011100942 | | 8/2011 | ............ H01R 13/629 |

OTHER PUBLICATIONS

German Office Action (w/machine translation) issued in application No. 10 2017 102 885.4, dated Sep. 28, 2017 (7 pgs).
International Search Report (w/translation) and Written Opinion (w/machine translation) issued in application No. PCT/DE2018/100089, dated Apr. 23, 2018 (17 pgs).
Chinese Official Action issued in related Chinese Application Serial No. 201880011888.5, dated Jul. 27, 2020 with English Translation (17 pages).

* cited by examiner

OPTICAL PLUG-IN CONNECTOR MODULE FOR A MODULAR INDUSTRIAL PLUG-IN CONNECTOR

BACKGROUND OF THE INVENTION

The invention relates to plug-in connector modules.

Other plug-in connector modules are known from the prior art which comprise, for example, electrical contact elements or pneumatic contacts. Housings of industrial plug-in connectors are equipped with such plug-in connector modules. This allows different variations of industrial plug-in connectors to be created.

BRIEF DISCUSSION OF THE PRIOR ART

Such plug-in connector modules are required as part of a modular plug-in connector system in order that a plug-in connector, in particular a heavy-duty rectangular plug-in connector, can be flexibly adapted to specific requirements with regard to the signal and energy transmission, e.g. between two electrical devices. To this end, plug-in connector modules are usually inserted into corresponding plug-in connector module frames, sometimes referred to as retaining frames, articulated frames, module frames or modular frames. The modular plug-in connector frames are therefore used to receive a plurality of similar and/or different plug-in connector modules and to fasten them securely to a surface and/or in a plug-in connector housing, or similar.

The plug-in connector modules generally have a substantially rectangular insulating body. These insulating bodies can function, for example, as contact carriers and accommodate and fix in place various kinds of contacts. The function of plug-in connectors formed in this way is thus very flexible. For example, pneumatic modules, optical modules, modules for transmitting electrical energy and/or electrical analog and/or digital signals can be accommodated in the respective insulating body and thus be used in the plug-in connector modular system. Increasingly, plug-in connector modules also perform measurement- and data-related tasks.

The plug-in connector module according to the invention is designed to be used in a housing of a so-called industrial plug-in connector, also termed a heavy-duty plug-in connector. The plug-in connector modules can be inserted in the plug-in connector housing directly or via a so-called retaining frame. In EP 2 537 212 A1 a plug-in connector housing is disclosed, which has a plurality of locking places for plug-in connector modules. Document EP 860 906 B1, for example, has a retaining frame, via which the plug-in connector modules can be inserted into the plug-in connector housing.

Plug-in connector modules have limited installation space, since they must fit into a designated slot of a plug-in connector housing or into a designated holding space in a retaining frame. Optical plug-in connector modules also need to be adapted to these requirements.

The coupling of the above-mentioned optical plug-in connector module must be carried out very precisely. The end faces of the optical waveguide or the contact areas of the integrated SC plug-in connectors must be very precisely aligned with respect to each other. This means that a large proportion (>95%) of the end faces must overlap each other, so that a good signal transmission can take place. In addition, the end faces must not be tilted relative to each other. If one intends to couple more than one of the above-mentioned SC plug-in connectors in parallel, one must take care to ensure the precise alignment of each individual SC plug-in connector coupling.

If the contact areas of the SC plug-in connectors are dirty, the signal transmission is impaired. The same problem exists if the fiber-optic cables are damaged, if in the case of an optical fiber, for example, a fiber is broken. In this case, it must be laboriously investigated to find where the fault is located in the plug-in connector. When multiple optical plug-in connectors are inserted at the same time, the problem is more serious because it may not always be immediately clear which plug-in connector has poor signal transmission.

US 2010/0008676 A1 discloses a device for detecting a fault in two optical fiber waveguides used for signal exchange. The device is inserted between the contact point of the fiber-optic cables and extracts a portion of the signal light for fault analysis. In plug-in connectors such a device would take up too much installation space.

US 2015/0103336 A1 discloses an optical plug-in connector with a detector in the vicinity of the optical waveguide for monitoring the mean optical power and localizing the plug-in connector itself.

US 2015/0341112 A1 and U.S. Pat. No. 7,088,880 B1 both disclose a detection device for the data traffic in optical cables.

U.S. Pat. No. 6,487,327 B1 discloses an optical plug-in connector with an optical waveguide and a detector assigned to the optical waveguide. The plug-in connector also comprises a set of evaluation electronics for determining a difference between the generated light signal and the signal threshold value. When a certain difference is reached between the generated light signal and the signal threshold a "warning" is issued.

The differential measurement proposed here has the disadvantage that the problem may sometimes be detected too late, because the plug-in connection is already no longer able to convey any signals, or only does so unreliably.

SUMMARY OF THE INVENTION

The object of the invention is to propose a plug-in connector module which in the event of poor signal transmission, allows a rapid resolution of the problem. In addition, such plug-in connector modules must still be able to function properly within the available space.

The plug-in connector module according to the invention contains at least one integrated optical waveguide. The plug-in connector module has at least one optical sensor, preferably a photodiode, which is arranged in the vicinity of the optical waveguide. Scattered light can be detected using the photodiode. The scattered light is only generated when a malfunction is present in the optical signal transmission. Such a malfunction can arise, for example, due to a break or crack in the optical waveguide. A malfunction but may also be caused by contamination of the end face of the optical cable with dirt.

The idea underlying the invention is to detect a malfunction in an optical plug-in connector module by means of scattered light as opposed to the drop in signal intensity. The detection of the scattered light can be so sensitive that in operation the plug-in connector still provides an adequate signal quality and is pre-emptively replaced during a service. By using the scattered light detection, a fault in the plug-in connector module can be detected much earlier.

Photodiodes contain light-sensitive materials. When light is incident on them an electric current is generated by the photoelectric effect, which, depending on the circuit, can also be detected as a resistance.

Preferably, the plug-in connector module has at least two optical waveguides and at least two photodiodes. Each optical waveguide in this case is assigned one photodiode. This means that every optical fiber in the plug-in connector module can be monitored by a photodiode.

In a particularly preferred embodiment of the invention the plug-in connector module has at least two optical waveguides and twice as many photodiodes. In this case, each optical waveguide is assigned two photodiodes, a first and a second photodiode. The two photodiodes can monitor the optical waveguide at two different areas or positions.

Preferably, the photodiode has a light entry opening which is aligned with the respective optical waveguide. The plane of the light entry opening is oriented perpendicular to the axial axis of the optical fiber waveguide. Due to this alignment, it is possible that the photodiode detects stray light from two directions, i.e. towards the diode and/or away from it when viewed in the direction of signal travel. Therefore, a potential source of interference can be located either in front of or behind the photodiode and be reliably detected in both cases.

In a particularly preferred variant of the invention, the plug-in connector module has a set of evaluation electronics which is coupled to the photodiode. The evaluation electronics detects the current or voltage of each individual photodiode. If the current or the voltage exceeds a certain threshold value, the evaluation electronics outputs a signal that indicates a malfunction. The signal can be, for example, an LED lighting device, which is mounted on the outside of the plug-in connector module. The signal can also be fed, however, to a much higher-level evaluation unit, which monitors a plurality of plug-in connector modules and can assign each malfunction directly to a specific plug-in connector module. As a result, the fault-finding and troubleshooting are made much easier for an engineer.

As a rule the entire evaluation electronics is mounted on a printed circuit board. The photodiode or the photodiodes can also be mounted on the same circuit board. The printed circuit board can have a compact design and be easily accommodated in the plug-in connector module. A power supply can be implemented, for example, via a battery on the circuit board.

An external supply of power, for example via conductors connected to the plug-in connector module, can also be realized however. Supplying power via a retaining frame of an industrial plug-in connector or via adjacent electrical plug-in connector modules in the retaining frame is also possible.

Preferably, the plug-in connector module comprises at least one SC plug-in connector, wherein the optical waveguide is arranged in the SC plug-in connector. Often the optical waveguide is arranged in a so-called ferrule, which, in turn, is fixed in the SC plug-in connector. The SC plug-in connector is preferably also locked in the plug-in connector module.

Advantageously, the SC plug-in connector has an opening. The opening is designed to be deep enough to allow direct access to the optical waveguide arranged in the SC plug-in connector. The light entry opening of the first photodiode is aligned towards the opening of the SC plug-in connector and parallel thereto. The two openings overlap over a large surface area. Ideally, the light entry opening of the first photodiode and the opening of the SC plug-in connector are flush with each other. This guarantees a high level of signal output from the photodiode.

In an advantageous embodiment of the invention the light entry opening of the second photodiode is aligned towards the contact area of the SC plug-in connector and parallel thereto. The contact area of the SC plug-in connector is formed by the end face of the optical waveguide integrated therein. If the contact area becomes dirty, the signal transmission or signal quality is degraded between a first and a second connector module plugged into it. In this case scattered light is produced in the contact area, which is detected by the second photodiode. As described above, a malfunction is signaled by the evaluation unit. The malfunction can be quickly located and corrected.

An industrial plug-in connector can contain a plurality of plug-in connector modules which are combined in a retaining frame. The retaining frame can be fixed into a plug-in connector housing. The plug-in connector module can also be embodied as a stand-alone plug-in connector however. In this case, the housing would not be shaped like a plug-in connector module but would have a different design. Alternatively, a plug-in connector housing can also have a single plug-in connector module.

In the present plug-in connector module, signal losses and/or malfunctions can be detected quickly and easily. An optical signal is guided through at least one optical waveguide of the plug-in connector module. The optical signal is scattered at a structural defect of the optical waveguide. The structural defect may take the form of a fiber breakage or thermal damage to the optical waveguide. The scattered light produced at the structural defect arrives at a first photodiode. A current or voltage is therefore generated at the first photodiode. When a threshold value of the current or the voltage is exceeded, a fault signal is generated and output by an evaluation electronics.

Alternatively or in addition, the optical signal is scattered from a contaminated area on the end face of the optical waveguide. The scattered light produced at the contaminated area arrives at a second photodiode. At the second photodiode a current or a voltage is thus generated. If a threshold value of the current or the voltage is exceeded, a fault signal is generated by an evaluation electronics.

BRIEF DESCRIPTION OF THE DRAWINGS

An exemplary embodiment of the invention is shown in the drawings and will be explained in more detail in the following. Shown are.

The figures in some cases contain simplified, schematic representations. In part, for similar but possibly not identical elements, identical reference numerals are used. Different views of the same elements might be shown to different scales.

DETAILED DESCRIPTION OF THE INVENTION

Figure 1:
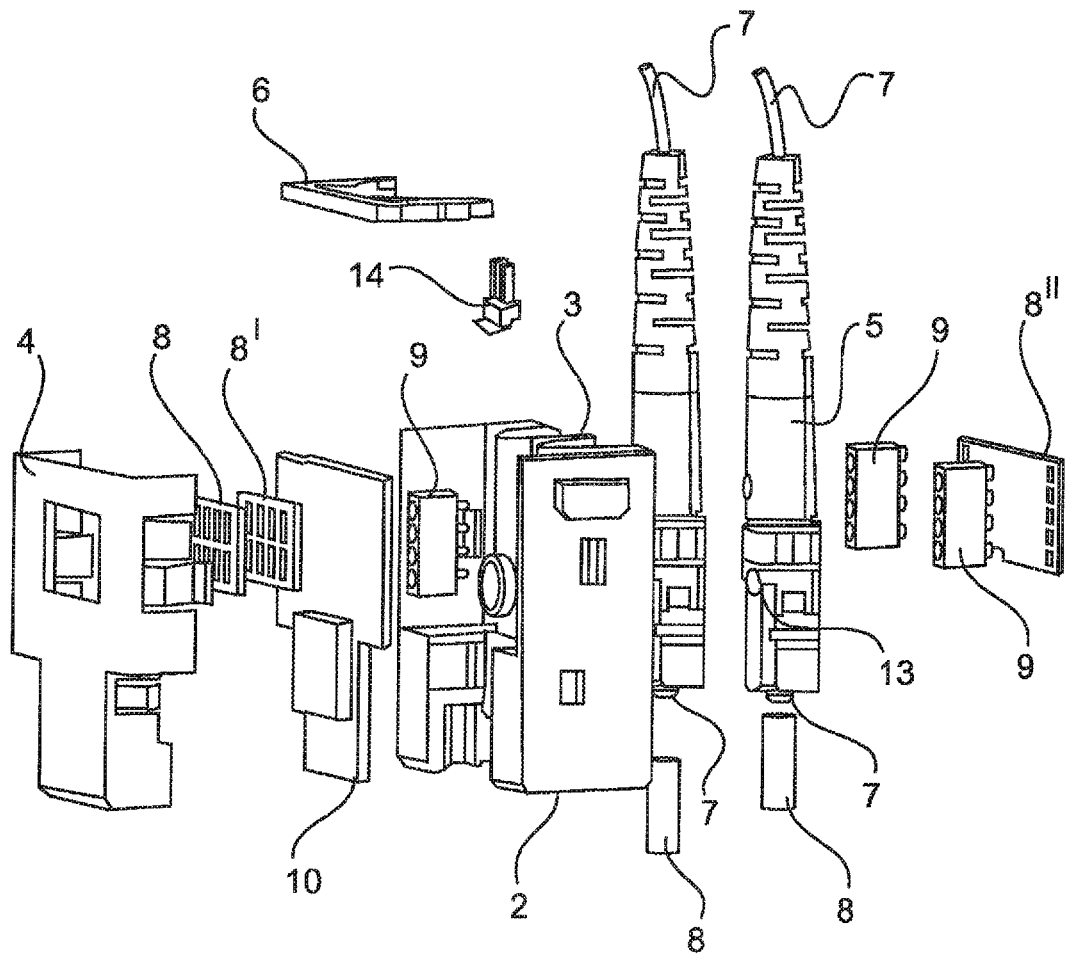
FIG. 1 an exploded drawing of a plug-in connector module according to the invention, FIG. 2 a perspective drawing of a printed circuit board with photodiodes mounted, FIG. 3 a top view of the plug-in connector module according to the invention, plugged into a matching mating plug-in connector module, FIG. 4 a sectional side view of the plug-in connector module according to the invention, plugged into a matching mating plug-in connector module, FIG. 5 an enlargement of the circular cutout D from FIG. 4 and FIG. 6 an enlargement of the circular cutout C from FIG. 4.

FIG. 1 shows an exploded drawing of one possible embodiment of a plug-in connector module 1 according to the invention. The plug-in connector module 1 consists of a housing 2 on whose narrow sides retaining tabs 3 are formed. Via these retaining tabs, 3, the plug-in connector module 1 can be integrated into a retaining frame (not shown) of a so-called heavy-duty plug-in connector (not shown). The housing 2 can be closed on one side with a housing cover 4. On the front face the housing 2 is closed off using a further cover 6.

In the housing 2, two SC plug-in connectors 5 are arranged and locked in place using snap-in means (not shown). In each of the SC plug-in connectors 5 an optical waveguide 7 is arranged, for example, an optical fiber. Via centering pins 8, the optical waveguides 7 in the plug-in connector module 1 are aligned in the mating direction with an accurate fit. The SC plug-in connectors 5 each contain an opening 13, through which the respective optical waveguide 7 contained therein is optically freely accessible.

On the wide sides of the plug-in connector module printed circuit boards 8, 8', 8" are arranged, with contact fingers on their outer sides. The conductor plates 8, 8', 8" are electrically connected to each other via so-called Pogo connectors 9. Via the contact fingers on the outer surfaces of the plug-in connector module 1, a plurality of plug-in connector modules 1, which are daisy-chained in a holding frame, for example, can be electrically connected to each other. Via the contact fingers an electrical signal can also be looped through the plug-in connector module. It is also possible to supply the plug-in connector module 1 with electric current via the contact fingers.

Figure 2:
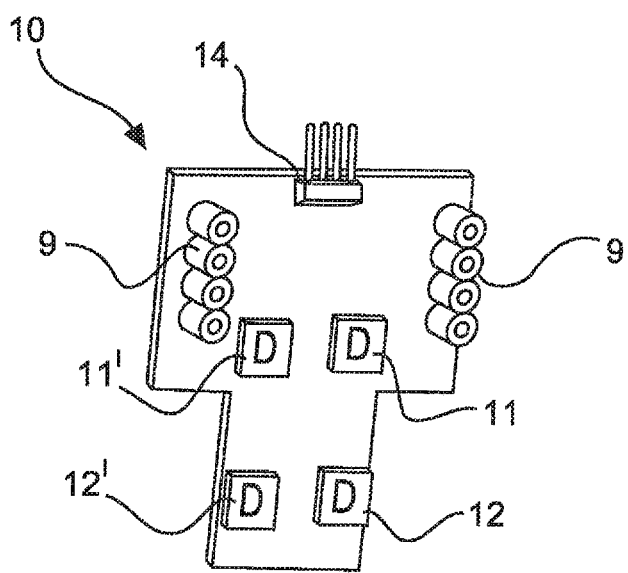

A circuit board 10 is arranged in the plug-in connector module 1 (FIG. 2). On the printed circuit board 10 four photodiodes are mounted, two first photodiodes 11, 11' and two second photodiodes 12, 12'. The respective light entry opening of the first photodiode 11, 11' is aligned towards the opening 13 of the SC plug-in connector 5, 5' assigned thereto, and parallel thereto. The light entry opening of the second photodiode 12, 12' is aligned towards the contact area of the SC plug-in connector 5, 5' assigned thereto, and parallel thereto. The respective first photodiodes 11, 11' can therefore monitor the interior of the respective SC plug-in connector 5, 5'. The respective second photodiodes 12, 12' monitor the end face of the respective optical waveguide 7 and therefore the contact area thereof with a fiber-optic cable 7' of a mating plug-in connector module 1' plugged into it. A plug-in PCB connector 14 is arranged on the circuit board 10. The four contact elements of the plug-in PCB connector 14 face in the direction of the end face of the plug-in connector module 1. The signals from the photodiodes 11, 11', 12, 12' can be sent through the PCB plug-in connector 14 and evaluated, for example, by a higher-level control unit. It is also possible to supply power for the photodiode and the evaluation electronics via the PCB plug-in connector 14.

Figure 3:
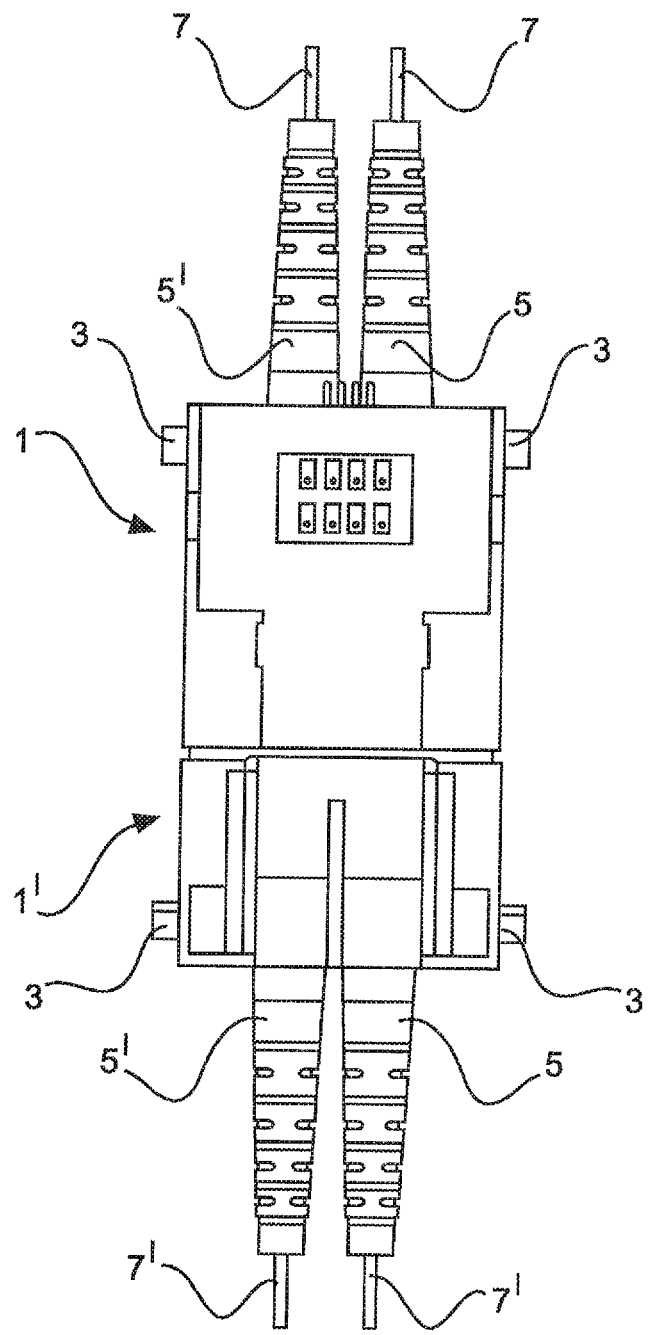
Figure 4:
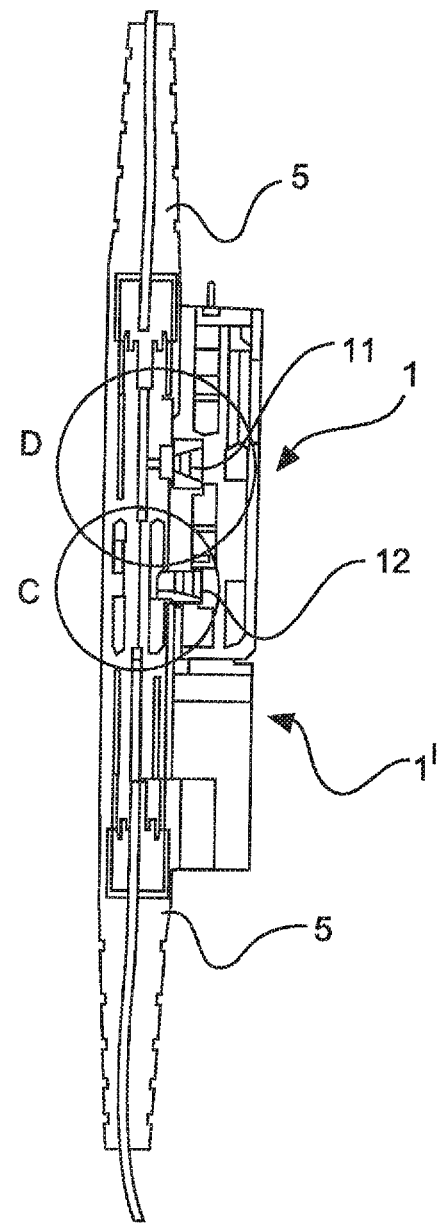
Figure 5:
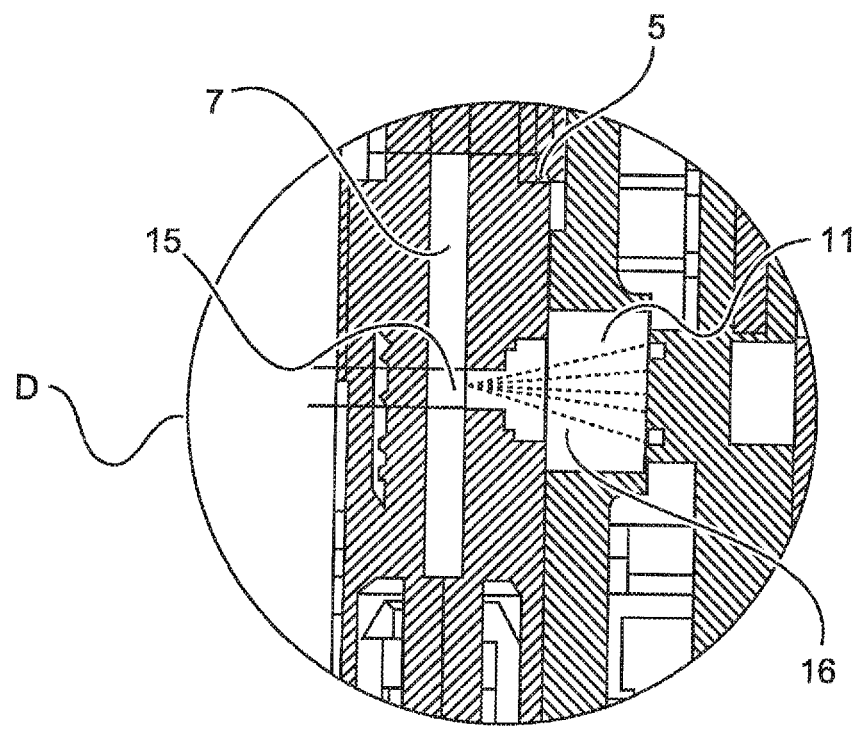
Figure 6:
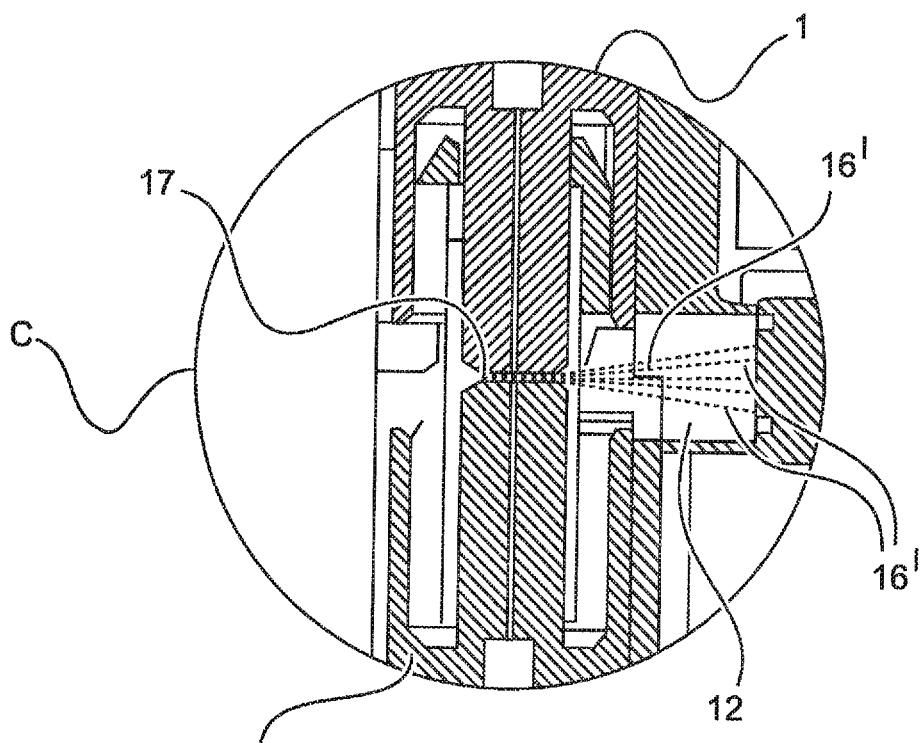

FIGS. 3 and 4 each show a plug-in connector module 1 according to the invention, which is plugged into a matching mating plug-in connector module 1' also designed according to the invention. The first photodiode 11 can detect a defect, such as a fiber breakage, in the interior of the SC plug-in connector 5. This detection region D is shown suitably enlarged in FIG. 5. The second photodiode 12 can detect a malfunction of the contact area caused, for example, by dirt contamination. This detection region C is shown suitably enlarged in FIG. 6.

If inside the SC plug-in connector 5, in the region before or after the opening 13, a fiber breakage 15 occurs due to mechanical stress on the plug-in connector module 1, scattered light 16 will reach the light entry opening of the first photodiode 11. If there is a contamination 17, such as dust, in the contact region between the plug-in connector module 1 and the mating plug-in connector module 1', scattered light 16' is produced, which is detected by the second photodiode 12. Such malfunctions can be detected by the evaluation electronics of the plug-in connector module 1, 1' and forwarded accordingly or signaled to an external location.

The detection sensitivity of the particular photodiode can be individually adjusted. If it is desired to detect a malfunction within the SC plug-in connector 5 at an early stage, then the first photodiode 11 can be set to a high sensitivity. The plug-in connector module 1 can still be operated, but a timely replacement can be scheduled straight away. The same applies to the degree of contamination in the contact area and the associated second photodiode 12.

LIST OF REFERENCE NUMERALS 1 plug-in connector module
2 housing
3 retaining tabs
4 housing cover
5 SC plug-in connector
6 cover
7 optical waveguide
8 printed circuit board
9 Pogo connector
10 printed circuit board
11 first photodiode
12 second photodiode
13 opening
14 PCB plug-in connector
15 fiber breakage
16 scattered light
17 contamination

The invention claimed is:
1. A plug-in connector module, which comprises at least one optical waveguide and which comprises at least one optical sensor for measuring scattered light, arranged in the vicinity of the optical waveguide,
  wherein the plug-in connector module comprises at least two optical waveguides and at least twice as many photodiodes,
  wherein each optical waveguide is assigned at least two photodiodes, a first photodiode and a second photodiode,
  wherein the plug-in connector module has an evaluation electronics, which is coupled to the photodiode,
  wherein the plug-in connector module comprises at least one SC plug-in connector,
  wherein the optical waveguide is arranged in the SC plug-in connector, wherein the SC plug-in connector has an opening,
  wherein the SC plug-in connector has an opening, and the light entry opening of the first photodiode is aligned towards the opening of the SC plug-in connector and parallel thereto, and
  wherein the light entry opening of the second photodiode is aligned towards the contact area of the SC plug-in connector and parallel thereto.

2. The plug-in connector module as claimed in claim 1, wherein each optical waveguide includes a photodiode having a light entry opening, which is aligned with the optical waveguide.

3. The plug-in connector module as claimed in claim 1, wherein each optical waveguide includes a photodiode having a light entry opening which is arranged perpendicular to the optical waveguide.

4. The plug-in connector module as claimed in claim 1, wherein the SC plug-in connector has an opening, and the light entry opening of the second photodiode is aligned towards the contact area of the SC plug-in connector and parallel thereto.

5. A plug-in connector having at least one plug-in connector module as claimed in claim 1.

6. A method for detecting signal losses during the signal transmission in an optical plug-in connector module, wherein an optical signal is guided through at least one optical waveguide of the plug-in connector module as claimed in claim 1, wherein the optical signal is scattered at a structural defect of the optical waveguide, wherein the scattered light arising at the structural defect reaches a first photodiode and a current or voltage is thereby generated at the first photodiode, wherein if a threshold value of the current or the voltage is exceeded a fault signal is generated by an evaluation electronics and/or wherein the optical signal is scattered from a contaminated area on the end face of the optical waveguide, the scattered light produced by the contamination reaching a second photodiode and a current or a voltage being produced thereby on the photodiode, wherein if a threshold value of the current or the voltage is exceeded, a fault signal is generated by an evaluation electronics.

* * * * *